CORE MEMORY ADDRESSING SYSTEMS

Filed Nov. 21, 1960 3 Sheets-Sheet 1

INVENTOR
FRED B. JONES

BY Leo J. Aubel

ATTORNEY

May 11, 1965 F. B. JONES 3,183,486

CORE MEMORY ADDRESSING SYSTEMS

Filed Nov. 21, 1960 3 Sheets-Sheet 2

United States Patent Office 3,183,486
Patented May 11, 1965

3,183,486

CORE MEMORY ADDRESSING SYSTEM

Fred B. Jones, San Jose, Calif., assignor to International Business Machines Corporation, New York, N.Y., a corporation of New York Filed Nov. 21, 1960, Ser. No. 70,688
2 Claims. (Cl. 340—166)

The present invention relates to a core memory address circuit and more particularly to circuit means arranged for simultaneously addressing a location and the next succeeding location of a memory or storage matrix forming a part of a computer or a data processing system.

In the operation of various data processing systems, it has been found that the time required for processing data may be significantly less than the time required to address or select the data which is to be processed from the associated storage means.

Accordingly, it is a principal object of the present invention to provide an apparatus for addressing a storage matrix for extracting data at a more rapid rate.

It is another object of the present invention to provide apparatus for extracting more than one unit of data from a storage matrix during a given period.

It is another object of the present invention to provide an apparatus for addressing storage means in a variable length data processing system.

In various matrices of the prior art, the switching schemes employed therein utilize as many sets of driver components as there are sets of individual drive lines connected to load sharing windings which are inductively coupled to each row of core drivers of a matrix. Thus, in the prior art schemes to drive a memory matrix, say a 10 x 10 matrix, there would be required a total of ten groups of line drivers and each group would contain as many individual driver components as there are individual drive lines. These requirements would therefore result in the use of an excessive number of driver components.

It is therefore another object of the present invention to provide an improved switching scheme for a driver matrix which utilizes a minimum number of driver components.

It is yet another object of the invention to provide a novel arrangement of driver gates and driver lines for driving the cores of a matrix to thereby provide an improved over-all matrix.

The foregoing and other objects, features and advantages of the invention will be apparent from the following more particular description of a preferred embodiment of the invention, as illustrated in the accompanying drawings.

In the drawings, like reference characters refer to like elements throughout:

Figures 3, 3A:
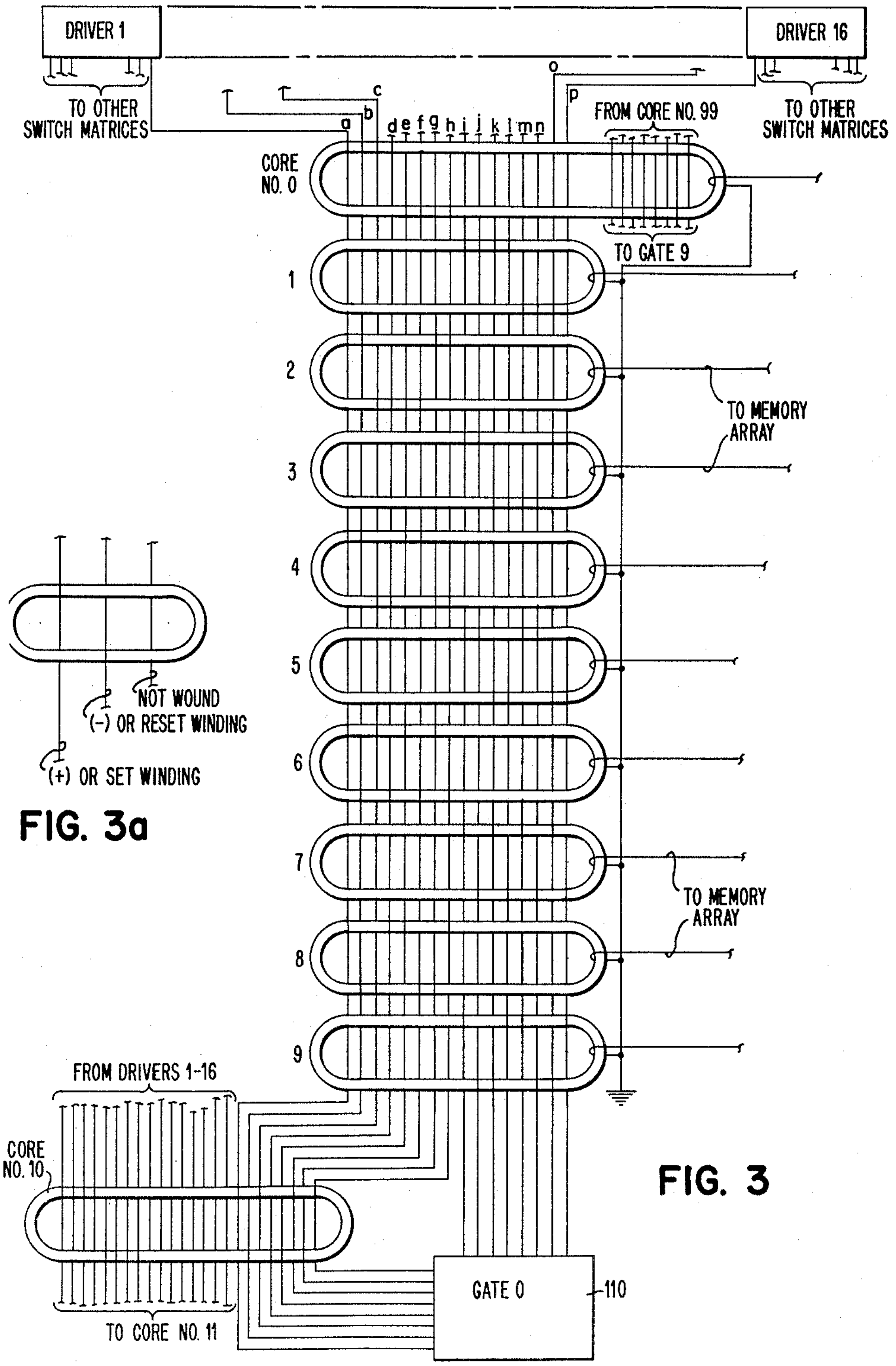
FIG. 3 is a schematic diagram showing the arrangement of the various combinations of winding patterns on the switch matrices.

FIG. 3*a* is a sketch depicting the manner of winding the cores of the switch matrices.

Before describing the structure and operation of the core memory address, the over-all concept of the invention will be discussed. As noted hereinabove, the time required for processing data logical circuitry of a data processing system may be significantly less than the time required to address or select the data which is to be processed from the associated storage means. Accordingly, it is the object of this invention to provide circuitry or structure for extracting more data from the storage means during each given time period. Obviously, if more data is extracted during each time period, it will have the effect of speeding up the operation of the over-all system.

As will be explained hereinbelow, the memory array is designed to have two distinct sets of magnetic cores (see sets 1 and 2, FIG. 2). A plurality of switch matrices connected intermediate the drivers and the drive lines of the memory matrix cause the drive lines to be energized in distinct patterns. When a combination of drivers is activated, a particular one of the cores in the switch matrices is selected. The winding pattern on the cores of the switch matrices is such that not only is the particular core selected but the next succeeding core is also selected. The output line from a given core in a switching matrix is connected in parallel to a group of lines coupled to one set of cores in the memory array; the output lines from the cores in the switching matrix adjacent said given core are connected in parallel to a group of lines coupled to the other set of cores in the memory array. Therefore, during each address or data selection period, a group of cores in both sets in the memory array are selected. The output from the cores in the memory array is coupled to the data processing circuitry of the system.

Also, before describing the structure and operation of the core memory address, the concept of the load sharing matrix will be briefly described. Load sharing circuits combine the magnetic (magnetomotive) forces generated by the currents in several drive windings so that the combined magnetic force has a value equal to that generated by a current which could be applied to a single driving winding. Consequently, each driving circuit or driver need only furnish a fraction of the current required to change the state of the magnetic core. This reduction in current and power required from each driving circuit is particularly advantageous where the current-carrying capacity of the drivers must be kept small. Thus, in the present case, the unit of current provided by each driver to the connected line generates a unit of magnetic force which is equal to the total magnetic force required to drive the core divided by the total number of drive windings.

In applying the principle of load sharing, N number of windings are inductively coupled to a core with one-half of the windings passing through the core in the "1" sense and the other half of the windings passing through the core in the "0" sense. Consequently, $N/2$ windings pass through the core in the "1" sense and $N/2$ windings pass through the core in the "0" sense. Hence, during read time of a memory cycle, by applying drive current pulses coincidently to the $N/2$ windings in the "1" sense, $N/2$ units of magnetic force are combined to drive a core, which is in the 0 state, to the 1 state. The change in flux, when the core switches from the 0 state to the 1 state, induces an output pulse of a first polarity or sense in the output winding of the core which may be used as a read drive pulse for a selected group of windings of a memory array.

Likewise, during write time of a memory cycle, by applying drive current pulses coincidently to the $N/2$ windings in the "0" sense, $N/2$ units of magnetic force are combined to drive the core which is in the 1 state, to the 0 state. The change in flux, when the core switches from the 1 state to the 0 state, induces an output pulse in the output winding of the core equal in magnitude, but of a second or opposite sense, which pulse may be used as a write drive pulse for the selected group of windings of a memory array.

Figure 2:
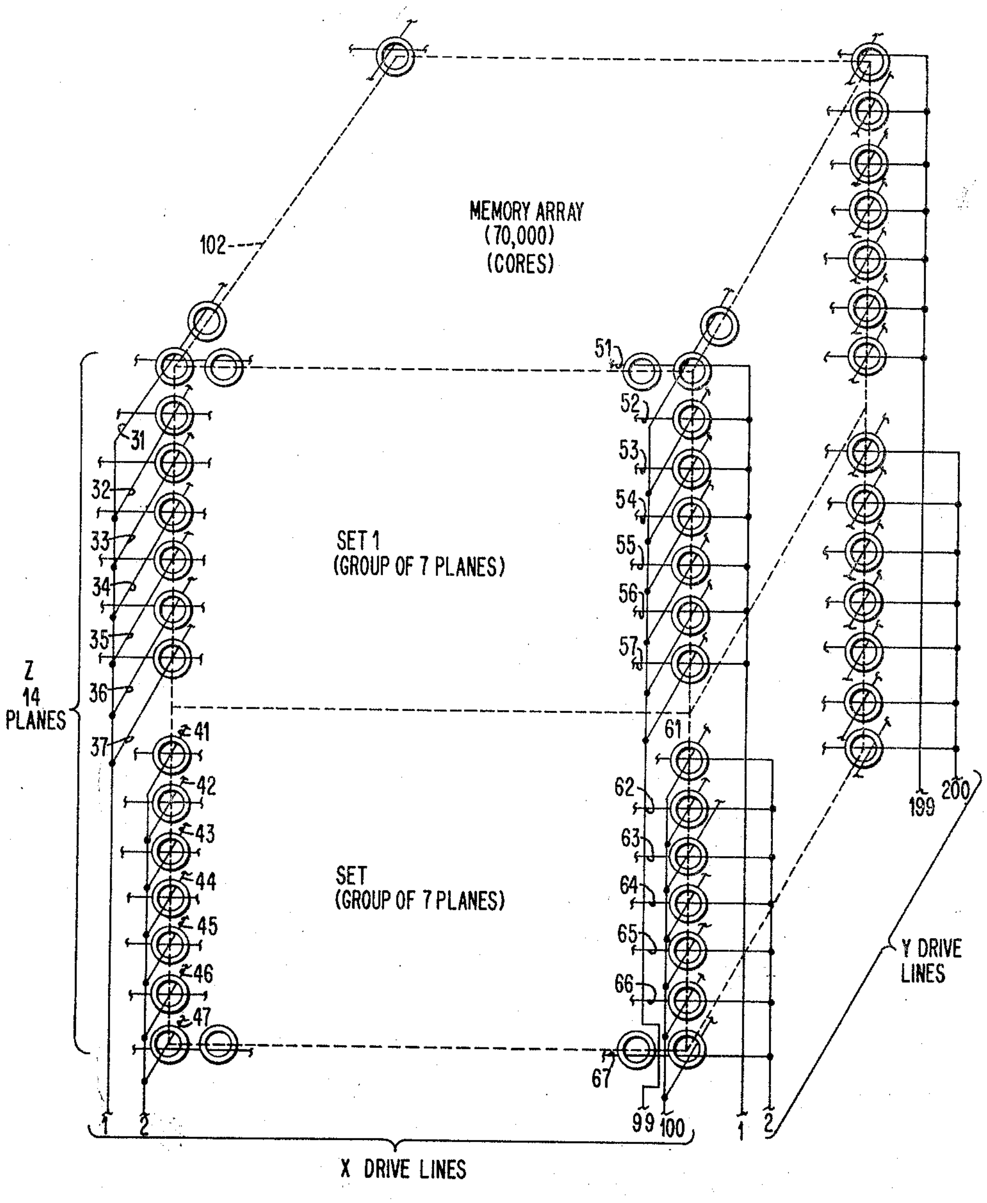
FIG. 2 is an enlarged view of a memory array showing the positioning of the cores and the configuration of the windings thereon.

Referring to FIG. 2, the memory array 102 is comprised of 14 planes of cores; 5000 cores in each plane;

each of the cores is a bistable magnetic element having substantially square loop characteristics. The cores are arranged in a parallelepiped configuration having X, Y and Z coordinate axes. As noted above, the array is arranged as two distinct sets, namely 1 and 2; each set contains seven planes of cores.

There are a total of 100 X drive lines coupled to the memory array 102. Each X drive line is connected in parallel to individual drive lines which thread, that is, are wound on cores in all the seven planes of one set. For example, X drive line number 1 connects, in parallel, to lines 31, 32, 33, 34, 35, 36 and 37 wound through the series of cores in the first column of each of the seven planes in set 1. Note that X drive line number 2 is connected, in parallel, to lines 41, 42, 43, 44, 45, 46 and 47 wound through the series of cores in the first column of each of the seven planes in set 2. The odd numbered ones of the X drive lines are thus coupled to energize cores in set 1 of the memory array and the even numbered ones of the X drive lines are coupled to energize cores in set 2.

As will be explained more fully hereinbelow, when a core in one of the switch matrices is selected, it will energize one of the X drive lines coupled to the cores in one set of the memory arrays, and due to the pattern of the windings on the switch cores and the manner in which the associated drives are activated, the succeeding core in the switch matrix will also be energized causing an adjacent X drive line in the memory array to be energized to thereby couple energy to the cores in the other set of the memory array.

There are a total of 200 Y drive lines. Each Y drive line, similarly to the X drive lines, is connected in parallel to lines which are wound on cores in all the seven planes of one set. For example, Y drive line number 1 connects in parallel to lines 51, 52, 53, 54, 55, 56 and 57 wound through the cores in the first row (the row nearest the reader, as oriented in FIG. 2) in set 1 of the memory array. For purposes of this discussion, the rows are considered to be perpendicular to the columns. Note that Y drive line number 2 is connected in parallel to lines 61, 62, 63, 64, 65, 66 and 67 wound through the cores in the first row (the row nearest the reader) in set 2 of the memory array. The odd numbered ones of the Y drive lines are thus coupled to energize cores in set 1 of the memory array and the even numbered ones of the Y drive lines are coupled to energize cores in set 2.

As above, when a core in one of the switch matrices is selected, it will energize one of the Y drive lines coupled to the cores in one set of the memory arrays. Due to the pattern of the windings on the switch matrices, a first core and a second core adjacent the first core will also be selected causing a first drive line and a second drive line adjacent the first drive line to be energized to thereby couple energy to the cores in the other set of the memory array.

The cores in the memory array are caused to shift their magnetic state, as is well known in the art, when there is coincidence of current at an intersection of the seven lines connected to each of the energized ones of the X and Y drive lines. It should be understood that a group of cores in the memory array are energized in each of the X and Y coordinates during each address or selection period; therefore, a word rather than a bit is selected during each address period.

Figure 1:
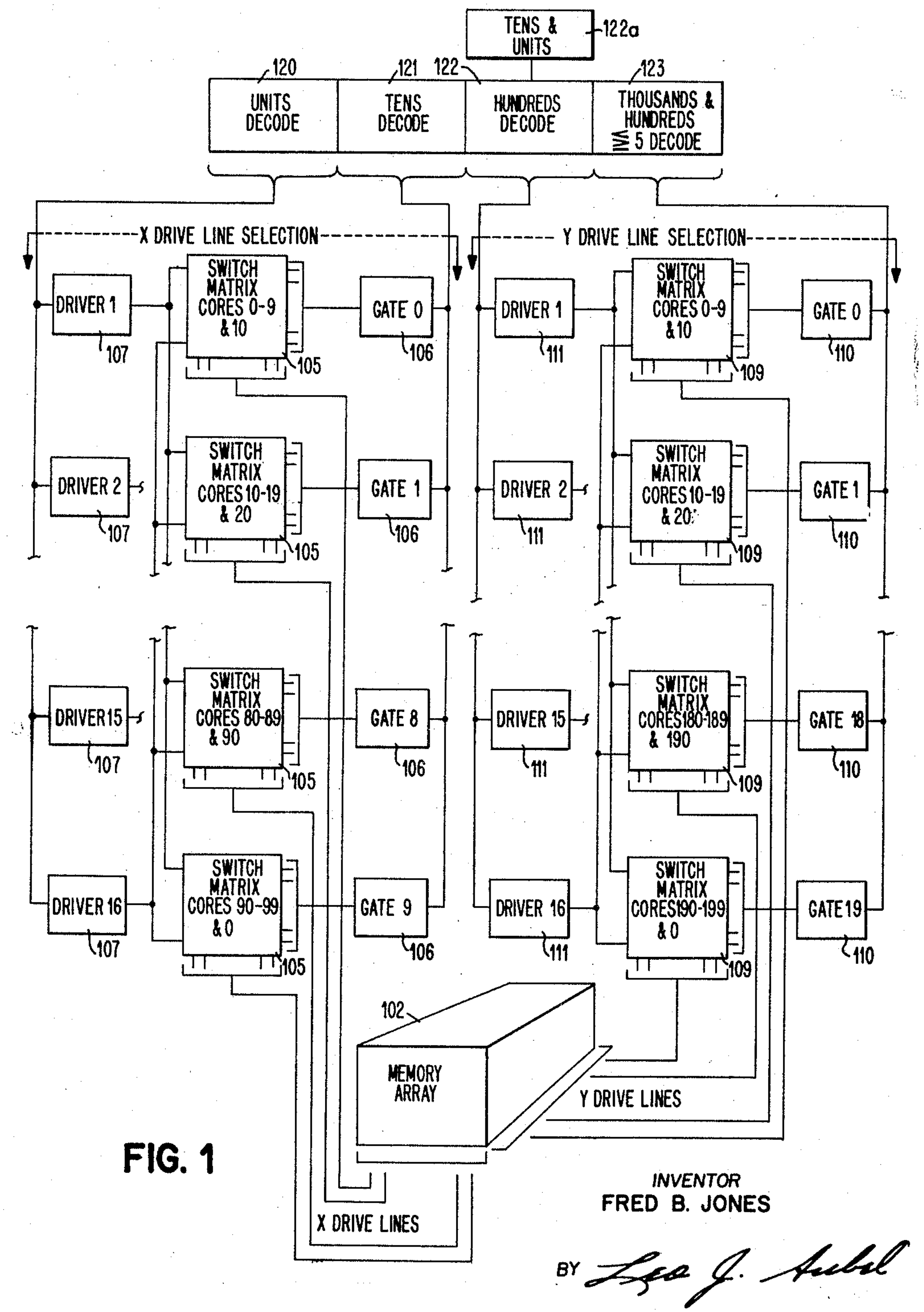
FIG. 1 is a block diagram of a core memory address system according to the invention.

Referring to FIG. 3, the details of the input lines or windings wound on the cores of the switch matrices will now be described. Referring briefly to FIG. 1, the switch matrices for the X drive selection, generally designated by the number 105, and the switch matrices for the Y drive selection, generally designated by the number 109, are all similar so that a showing and description of one switch matrix, namely, the switch matrix for cores 0–9 and core 10 of matrices 109 is sufficient. A total of 16 input lines indicated by the alphabetic characters *a–p* are connected to each switch matrix; that is, one line is connected to each of the switch matrices 105 and 109 from each of the drivers for the X and Y drive selection, respectively, generally designated by the numerals 107 and 110. The windings are wound through the cores as indicated in the following Table I wherein a plus sign indicates a winding in the "set" sense and a minus sign indicates a winding in the "reset" sense. The manner of depicting the windings in FIG. 3 is shown in FIG. 3*a*.

*Table I*

| Cores | Windings | | | | | | | | | | | | | | | |
|---|---|---|---|---|---|---|---|---|---|---|---|---|---|---|---|---|
| | *a* | *b* | *c* | *d* | *e* | *f* | *g* | *h* | *i* | *j* | *k* | *l* | *m* | *n* | *o* | *p* |
| 0 | + | + | + | + | − | − | − | − | Not Threaded | | | | | | | |
| 1 | Not Threaded | | | | | | | | + | + | + | + | − | − | − | − |
| 2 | + | + | − | − | − | − | + | + | Not Threaded | | | | | | | |
| 3 | Not Threaded | | | | | | | | + | + | − | − | − | − | + | + |
| 4 | + | + | − | − | + | + | − | − | Not Threaded | | | | | | | |
| 5 | Not Threaded | | | | | | | | + | + | − | − | + | + | − | − |
| 6 | + | − | + | − | + | − | + | − | Not Threaded | | | | | | | |
| 7 | Not Threaded | | | | | | | | + | − | + | − | + | − | + | − |
| 8 | + | − | − | + | + | − | − | + | Not Threaded | | | | | | | |
| 9 | Not Threaded | | | | | | | | + | − | − | + | + | − | − | + |
| 0[1] | + | − | + | − | − | + | − | + | Not Threaded | | | | | | | |

[1] Windings are wound through core of succeeding switch matrix; windings are connected to gate associated with this matrix.

Each matrix is comprised of ten cores. Each core has eight of the 16 input lines *a–p* wound thereon, in combinations, as seen in the table. The 16 input lines *a–p* connected to each core matrix are terminated in a gate, for example gate 0 in FIG. 3. In addition, the first core in each switch matrix has an additional eight input lines from the preceding matrix wound thereon in a combination, as shown in the table. The eight lines from a given matrix (say switch matrix cores 0–9) thus are wound on the first core of the succeeding matrix (switch matrix cores 10–19); however, the lines terminate in the respective gate for the given matrix, for example, gate 0 for the switch matrix cores 0–9. The eight input lines are wound on the first core of the succeeding matrix in order to also permit the selection of said first core when the last core of the preceding matrix is selected. For example, in FIG. 3, when core 9 is addressed core 10 is also selected.

As will be appreciated, eight input lines wound on the last core of the last switch matrix in each of the X and Y drive line selection sections are also wound through the first core of the first switch matrix in the respective selection group to also select the first core in the respective selection section when the last core thereof is selected. For example, when core 99 (FIG. 3) in the X drive line selection section is addressed, core 0 is also selected.

For each address, a unique combination of eight out of the 16 drivers are selected. Four of the selected windings are in the first half, that is, the *a–h* group of windings and four of the selected windings are in the second half, that is, the *i–p* group of windings. As seen from Table I, the even-numbered cores are selected by a combination of four groups of windings in the *a–h* group and the odd-numbered cores are selected by a combination of four groups of windings in the *i–p* group. Note in Table I that the winding pattern of windings *a–h* on core 0 is the same as the winding pattern of windings *i–p* on core 1; similarly, for the other cores in each of the switch matrices. Thus, the four selected windings in each of the first and second halves of the groups of windings energize two adjacent cores. When, for example, windings *a, b, c, d*, and *i, j, k, l* are selected, cores 0 and 1 are switched; likewise, when windings *a, b, g, h* and *i, j, k, l* are energized, cores 1 and 2 are switched; and so forth. Consequently, if a core is selected (switched), the succeeding numbered core is also switched.

For the write portion of the cycle, the eight unselected drivers are activated, switching the selected cores to their initial state.

The output lines from the cores of the switch matrices 105 and 109 comprise the X and Y drive lines, respectively, for the memory array 102.

Referring now to FIG. 1, the units decode position 120 and the tens decode position 121 of the memory address selection control the X drive lines through drivers 107 and switch matrices 105. The hundreds decode 122, the tens and units decode 122*a*, and the thousands and hundreds $\substack{< \\ \geqslant}$ 5 decode 123 control the drive lines through drivers 111 and switch matrices 109. The decodes or code converters 120–123 are of any suitable known type. The units and hundreds decodes or decoders 120 and 122 convert the machine code to an 8 out of 16 code to respectively drive the X and Y selection drivers. The tens decode 121 converts the machine code to a 1 out of 10 code, and the thousands and hundreds decoder 123 converts the machine code to a 1 out of 20 code for respectively opening the X and Y selection gates.

Consider first the X drive line selection. There are a total of 16 drivers 107 of any suitable known type. The units decode position 120 is connected, in parallel, to each of the 16 drivers. Each of drivers 107 has an output connected to each of the ten groups of switch matrices 105. The tens decode positions 121 is connected, in parallel, to each of a total of ten gates, generally designated by the number 106, connected to respective ones of the switch matrices 105. In order to energize a particular X drive line, the units decode position 120 activates a particular driver and the tens decode position 121 opens an associated gate.

The Y drive line selection includes a total of 16 drivers 111. The tens and units 122*a* and hundreds decode positions 122 are connected in series with one another and in parallel to each of drivers 111 which drivers are similar to drivers 107. Each of drivers 111 has an output connected to each of a total of twenty groups of switch matrices 109. The thousands and hundreds $\substack{< \\ \geqslant}$ 5 decode position 123 is connected, in parallel, to each of a total of twenty gates, generally designated by the number 110, connected to respective ones of the switch matrices 109. In order to energize a particular Y drive line, the tens and units 122*a* and the hundreds decode positions 122 activate a particular driver and the thousands and hundreds $\substack{< \\ \geqslant}$ 5 decode position 123 opens an associated gate.

As examples, Tables II–IV indicate the logic that may be used in the various decode positions 120–123. Table II indicates the "units" decode 120 logic; the respective X drivers 107 numbers 1–16 will be energized at "Read" time if the units digit of the address is one of the numbers to the right. For example, if the units digit of the address is 0, X drivers 1, 2, 3, 4, 9, 10, 11 and 12 will be energized; if the units digit of the address is 1, drivers 1, 2, 7, 8, 9, 10, 11 and 12 will be energized, etc. Table III indicates the "hundreds" decode 122 logic and the Tens and Units decode 122*a* logic; a different set of drivers among the first eight drivers will be selected depending on whether or not the tens and units equal 99. For example, if the hundreds digit of the address is 1, and if the tens and units digits are equal to 99, Y drivers 1, 2, 7, 8, 9, 10, 15 and 16 will be energized; if the hundreds digit of the address is 1, and if the tens and units digits are not equal to 99, Y drivers 1, 2, 5, 6, 9, 10, 15 and 16 will be energized. Table IV indicates the Tens Decode 121 logic which is a simple 1 out of 10 decimal decode. For example, if the tens digit is 0, gate 0 in the X drive will be opened; if the tens digit is 1, X gate 1 will be opened, etc. Table IV also indicates the logic of the Thousands and Hundreds $\substack{< \\ \geqslant}$ 5 decode 123. In the table the symbol $<$ indicates less than, and $\geqslant$ indicates greater or equal to. The thousands digit provides a 1 of 10 selection and the hundreds digit provides a 1 of 2 selection so that one of the twenty gates will be selected. For example, if the thousands digit is 0 and the hundreds digit is $< 5$, Y gate 0 will be opened; if the thousand digit is 0 and the hundreds digit is $\geqslant 5$, Y gate 1 will be opened. The foregoing decoding scheme is peculiar to the disclosed 50 x 100 memory array; other arrays would necessarily require somewhat different decode schemes.

*Table II*

| X Drivers | Units Digits |
|---|---|
| 1 | 0–9 |
| 2 | 0, 1, 2, 3, 4 |
| 3 | 0, 5, 6, 9 |
| 4 | 0, 7, 8 |
| 5 | 3, 4, 5, 6, 7, 8 |
| 6 | 3, 4, 9 |
| 7 | 1, 2, 5, 6 |
| 8 | 1, 2, 7, 8, 9 |
| 9 | 0–9 |
| 10 | 0, 1, 2, 3, 4, 5 |
| 11 | 0, 1, 6, 7 |
| 12 | 0, 1, 8, 9 |
| 13 | 4, 5, 6, 7, 8, 9 |
| 14 | 4, 5 |
| 15 | 2, 3, 6, 7 |
| 16 | 2, 3, 8, 9 |

*Table III*

| Y Drivers | Hundreds Digit | |
|---|---|---|
| 1 | 0–9 | |
| | Tens and Units=99 | Tens and Units≠99 |
| 2 | 0, 1, 2, 5, 6, 7 | 0, 1, 5, 6 |
| 3 | 0, 3, 5, 8 | 2, 4, 7, 9 |
| 4 | 0, 4, 5, 9 | 3, 8 |
| 5 | 2, 3, 4, 7, 8, 9 | 1, 2, 3, 6, 7, 8 |
| 6 | 2, 7 | 1, 4, 6, 9 |
| 7 | 1, 3, 6, 8 | 0, 2, 5, 7 |
| 8 | 1, 4, 6, 9 | 0, 3, 4, 5, 8, 9 |
| 9 | 0–9 | |
| 10 | 0, 1, 2, 5, 6, 7 | |
| 11 | 0, 3, 5, 8 | |
| 12 | 0, 4, 5, 9 | |
| 13 | 2, 3, 4, 7, 8, 9 | |
| 14 | 2, 7 | |
| 15 | 1, 3, 6, 8 | |
| 16 | 1, 4, 6, 9 | |

*Table IV*

| X Gates | Tens Digit |
|---|---|
| 0 | 0 |
| 1 | 1 |
| 1 | 1 |
| 1 | 1 |
| 1 | 1 |
| 9 | 9 |

| Y Gates | Thousands Digit | | Hundreds Digit |
|---|---|---|---|
| 0 | 0 | and | <5 |
| 1 | 0 | and | ≥5 |
| 2 | 1 | and | <5 |
| 3 | 1 | and | ≥5 |
| 4 | 2 | and | <5 |
| 5 | 2 | and | ≥5 |
| 6 | 3 | and | <5 |
| 7 | 3 | and | ≥5 |
| 8 | 4 | and | <5 |
| 9 | 4 | and | ≥5 |
| 10 | 5 | and | <5 |
| 11 | 5 | and | ≥5 |
| 12 | 6 | and | <5 |
| 13 | 6 | and | ≥5 |
| 14 | 7 | and | <5 |
| 15 | 7 | and | ≥5 |
| 16 | 8 | and | <5 |
| 17 | 8 | and | ≥5 |
| 18 | 9 | and | <5 |
| 19 | 9 | and | ≥5 |

To address a particular location in the memory array 102, a particular X drive line is energized and a particular Y drive line is concurrently energized. As noted hereinabove, not only is a particular location addressed, but because of the configuration of the memory array 102 a second location is also selected or addressed.

The operation of the core address memory can readily be appreciated from the foregoing discussion of the structure. To address a particular location in the memory matrix, each of the decode positions 120–123 provides an output control signal. In the X drive selection, the drivers 107 are activated in a particular combination to provide a distinct output pattern to the input lines *a–p* connected to the switch matrices 105; concurrently, the desired one of gates 106 is opened to permit the drivers 107 to energize the selected core in the associated matrix. As noted, not only is the selected core energized but the core adjacent thereto is also energized. Likewise, in the Y drive selection the drivers 111 are energized in a particular combination to provide a distinct output pattern to the input lines *a–p* connected to the switch matrices 109; concurrently, the desired one of gates 110 is opened to permit the drivers 111 to energize the selected core in the associated matrix. Again, not only is the selected core energized but the core adjacent thereto is also energized.

As noted, the output lines of the switch matrices 105 and 109 comprise or are connected to the X and Y drive lines connected to the core memory array 102. A total of four drive lines will thus be energized; two X drive lines and two Y drive lines. As also noted, each of the X and Y drive lines is connected, in parallel, to lines coupling energy to cores in each of the seven planes in one set of the memory array 102; that is, a distinct drive line is connected to each row or column of cores. Consequently, at the point where the groups of seven lines connected to the energized ones of X and Y drive lines intersect, the cores are caused to shift magnetic states, that is, a particular location is addressed. Since adjacent ones of the X and Y drive lines are connected to lines in different sets of the memory array, a distinct location is addressed in each set of the memory array concurrently; or, in other words, two locations in the memory array are addressed concurrently. For example, assume that location 9986 in memory is to be addressed. For indicating 6 (see Table II), the units decode 120 will energize X drivers 1, 3, 5, 7, 9, 11, 13 and 15. For indicating 8 (see Table IV), the tens decode 121 will cause X gate 8 to be opened. For indicating 9 (see Table III), the hundreds decode 122 will energize Y drivers 1, 4, 5, 8, 9, 12, 13 and 16. For indicating 9 (see Table IV), the thousands decode 123 will cause Y gate 19 to be opened (since the hundreds digit 9 is ≥5).

Activation of the aforementioned drivers and gates in the X drive line selection section will cause cores 82 and 83 of the switch matrix 105 to provide a current flow in the associated X drive lines. As noted, the X drive line from core 82 is connected to set 2 of memory 102, and the X drive line from core 83 is connected to set 1 of memory 102.

Likewise, for the Y drive selection section, core 198 and core 199 in switch matrix 109, will energize two adjacent Y drive lines, one of which lines is connected to set 1 of memory array 102 and the other of which is connected to set 2 of memory array 102.

Thus, a group of cores in set 1 of memory 102 and a group of cores in set 2 of memory 102 are addressed concurrently.

While the invention has been particularly shown and described with reference to a preferred embodiment thereof, it will be understood by those skilled in the art that changes in form and details may be made therein without departing from the spirit and scope of the invention.

What is claimed is:

1. A system for addressing two sequential address locations in a memory matrix array of cores having substantially square-loop hysteresis characteristics, comprising, in combination, an addressing matrix including a plurality of cores divided into two groups, one set of input windings threaded in either a set or a reset sense through all cores of one of the groups according to a predetermined pattern, another set of input windings threaded in either a set or a reset sense through all cores of the other group according to a similar pattern, said pattern varying from one core to the next succeeding core according to a variable arrangement in which half of the windings associated with one core of one group are wound in the same pattern as the other half of the windings which are associated with a succeeding core of the same group so that irrespective of which group of cores is addressed the next succeeding core in the remaining group will be selected concurrently therewith, and driving means for selectively energizing a portion of the windings of the group during successive selection periods.

2. A system according to claim 1, wherein there are a plurality of such addressing matrices, and one gating means and one driving means associated with each such matrix, the input windings wound through the last core of a given group in one matrix being also wound through the first core of the corresponding group in the next successive matrix, such that upon selection of the last core in said one matrix, the first core in said next matrix will be concurrently selected, there thus being twice as many input lines wound through the first core of each matrix as there are through the remaining cores of the matrix, and said first core thus having windings connected to the driving means for two adjacent matrices.

References Cited by the Examiner

UNITED STATES PATENTS

| | | | |
|---|---|---|---|
| 2,734,182 | 2/56 | Rajchman | 340—166 |
| 2,734,183 | 2/56 | Rajchman | 340—166 |
| 2,734,187 | 2/56 | Rajchman | 340—174 |
| 2,776,419 | 1/57 | Rajchman | 340—174 |
| 2,809,367 | 10/57 | Stuart-Williams | 340—174 |
| 2,882,517 | 4/59 | Warren | 340—174 |
| 3,028,581 | 4/62 | Thorpe | 340—166 |

NEIL C. READ, *Primary Examiner.*

IRVING SRAGOW, STEPHEN W. CAPELLI, *Examiners.*